(12) United States Patent
Ashiura et al.

(10) Patent No.: US 7,700,695 B2
(45) Date of Patent: Apr. 20, 2010

(54) MODIFIED BUTYL RUBBER COMPOSITION

(75) Inventors: Makoto Ashiura, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/240,201

(22) Filed: Sep. 29, 2008

(65) Prior Publication Data

US 2009/0093587 A1    Apr. 9, 2009

(30) Foreign Application Priority Data

Oct. 1, 2007    (JP) .............................. 2007-257532

(51) Int. Cl.
*C08C 19/22* (2006.01)

(52) U.S. Cl. ........................ 525/374; 525/184; 525/244; 525/383

(58) Field of Classification Search ................. 525/242, 525/244, 374, 326.2, 383, 18
See application file for complete search history.

(56) References Cited

U.S. PATENT DOCUMENTS

| | | |
|---|---|---|
| 2005/0124764 A1 | 6/2005 | Onoi et al. |
| 2005/0222343 A1 | 10/2005 | Ashiura et al. |
| 2006/0155079 A1 | 7/2006 | Ashiura et al. |
| 2006/0160956 A1* | 7/2006 | Ashiura et al. .............. 525/242 |
| 2008/0262147 A1 | 10/2008 | Ashiura et al. |

FOREIGN PATENT DOCUMENTS

| | | |
|---|---|---|
| EP | 1777237 | 4/2007 |
| EP | 1983027 | 10/2008 |
| JP | 62-074934 A | 4/1987 |
| JP | 02-192940 A | 7/1990 |
| JP | 06-172547 A | 6/1994 |
| JP | 2006-131780 | 9/2007 |
| JP | 2007-231244 | 9/2007 |
| JP | 2007-110605 | 11/2008 |
| WO | WO-2006032765 | 3/2006 |
| WO | WO-2008136175 A1 | 11/2008 |

\* cited by examiner

*Primary Examiner*—Ling-Siu Choi
(74) *Attorney, Agent, or Firm*—Connolly Bove Lodge & Hutz LLP

(57) ABSTRACT

A modified butyl rubber composition comprising a butyl rubber modified by mixing, under heating, (a) a compound having a nitroxide-free radical in the molecule thereof, which is stable at an ordinary temperature even in the presence of oxygen, (b) a radical initiator, and (c) a bi- or more-functional radical polymerizable monomer and further by compounded with (d) a bi- or more-functional radical polymerizable monomer, which is different from the ingredient (c).

6 Claims, No Drawings

MODIFIED BUTYL RUBBER COMPOSITION

TECHNICAL FIELD

The present invention relates to modified butyl rubber composition, more particularly relates to a modified butyl rubber composition having the improved mechanical strength, solvent permeability resistance and heat resistance of the cross-linked product thereof.

BACKGROUND ART

The inventors previously found that, by first grafting, to a butyl rubber, a compound having a nitroxide-free radical in the molecule thereof and further reacting the same with a polyfunctional acrylate, the modified butyl rubber obtained becomes peroxide cross-linkable (see Japanese Patent Application No. 2006-131780 (filed on May 10, 2006)).

DISCLOSURE OF THE INVENTION

Accordingly, the object of the present invention is to provide the modified butyl rubber having the improved mechanical strength of the cross linked product thereof and also having the improved solvent permeation resistance and heat resistance of the cross-linked product thereof.

In accordance with the present invention, there is provided a modified butyl rubber composition comprising a butyl rubber modified by mixing, under heating, (a) a compound having a nitroxide-free radical in the molecule thereof, which is stable at an ordinary temperature even in the presence of oxygen, (b) a radical initiator and (c) a bi- or more-functional radical polymerizable monomer and further compounded with (d) a bi- or more-functional radical polymerizable monomer, which is different from the component (c).

According to the present invention, by compounding, into a peroxide-cross-linkable modified butyl rubber, obtained by grafting, to a butyl rubber previously developed by the inventors, a compound having a nitroxide-free radical in the molecule thereof and further reacting the same with a polyfunctional acrylate, which is different from the acrylate used during modification of the butyl rubber, the mechanical strength of the cross-linked product can be improved.

BEST MODE FOR CARRYING OUT THE INVENTION

In this specification and in the claims which follow, the singular forms "a", "an" and "the" include plural referents unless the context clearly dictates otherwise.

The inventors engaged in research for solving the above problem and, as a result, found that, by compounding, into a peroxide cross-linkable modified butyl rubber, obtained by grafting, to a butyl rubber, a compound having a nitroxide-free radical in the molecule thereof and further reacting the same with a polyfunctional acrylate, which is different from the acrylate used during modification, the mechanical strength of the cross-linked product can be improved and, further, found that the solvent permeation resistance and heat resistance thereof can be improved.

The butyl rubber modified by the present invention is a copolymer rubber of isobutylene and a small amount (e.g., 0.6 to 2.5 mol % of the rubber as a whole) of isoprene or its derivatives such as a chlorinated butyl rubber, brominated butyl rubber, which is called "butyl rubber (IIR)". These are well known in the industry. There are also many commercially available products.

The compound (a) having a nitroxide radical in the molecule thereof, which is stable at an ordinary temperature in the presence of oxygen, usable in the present invention is not limited to these, but the following compounds may be illustrated:

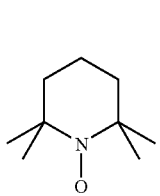
2, 2, 6, 6-tetramethyl-1-piperidinyloxy (TEMPO)

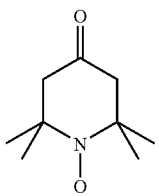
4-oxo TEMPO

General Formulae

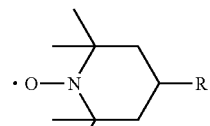
(1)

(2)

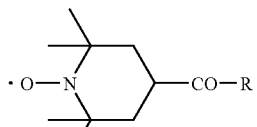
(3)

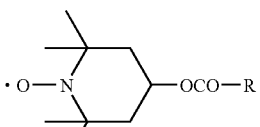
(4)

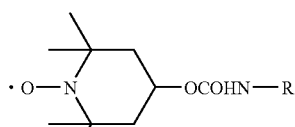
(5)

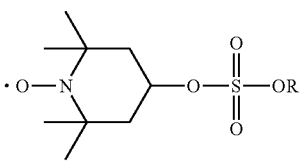
(6)

In the formulae (1) to (6), wherein R indicates a $C_1$ to $C_{30}$ alkyl group, allyl group, amino group, isocyanate group, hydroxyl group, thiol group, vinyl group, epoxy group, thiirane group, carboxyl group, carbonyl group-containing group (e.g., anhydrous succinic acid, anhydrous maleic acid, anhydrous glutaric acid, anhydrous phthalic acid, and other cyclic acid anhydrides), amide group, ester group, imide group, nitrile group, thiocyan group, $C_1$ to $C_{20}$ alkoxy group, silyl group, alkoxysilyl group, nitro group, or other functional group-containing organic group.
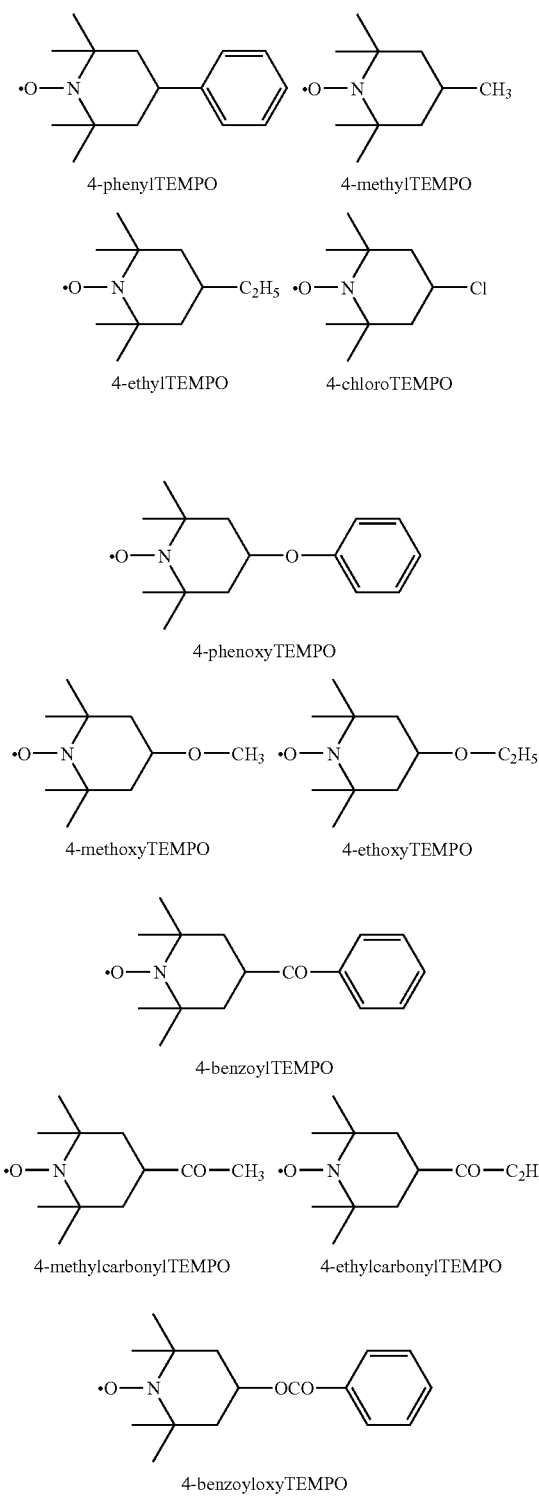
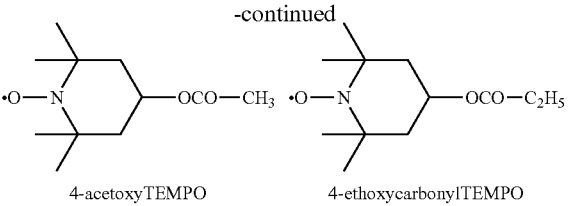
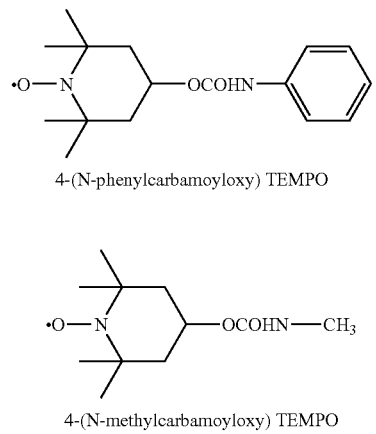
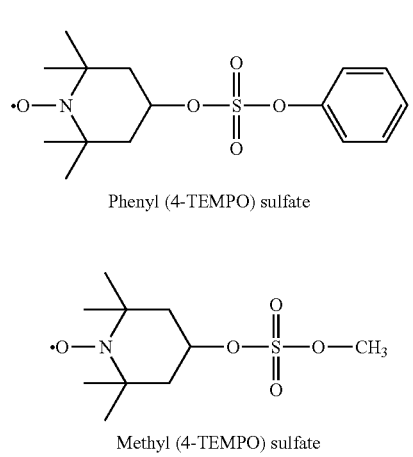

Other examples are as follows:
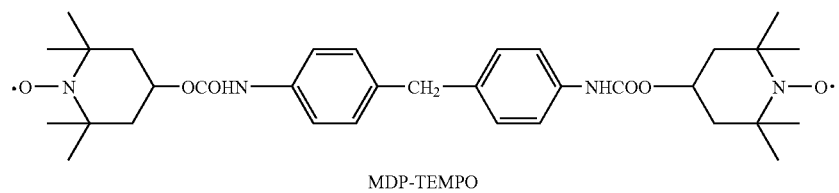
MDP-TEMPO
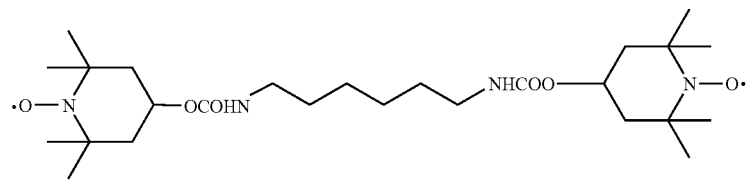
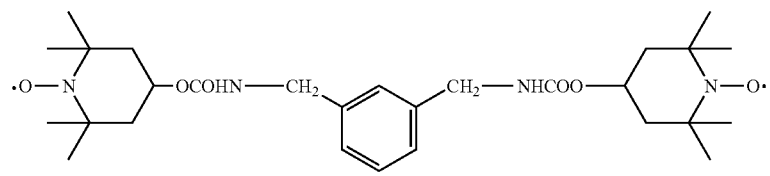
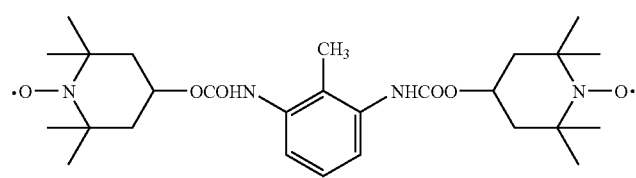
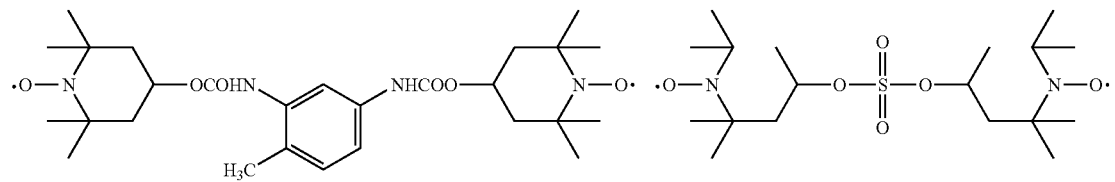
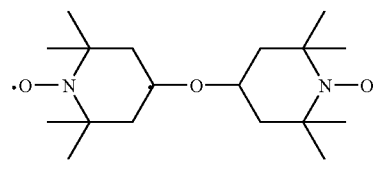
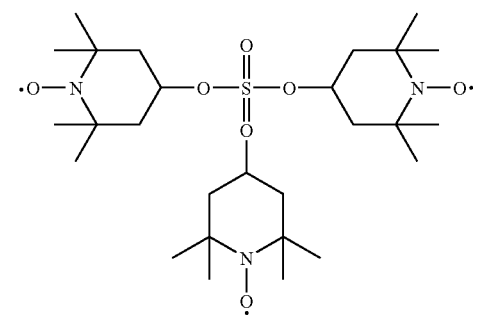
2,2,6,6-tetra-methylpiperidin-1-yloxy
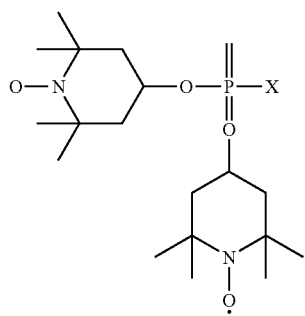
X; Br or Cl
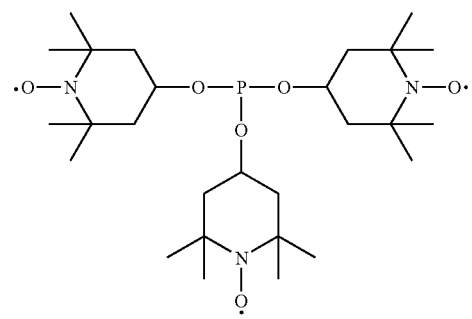

-continued
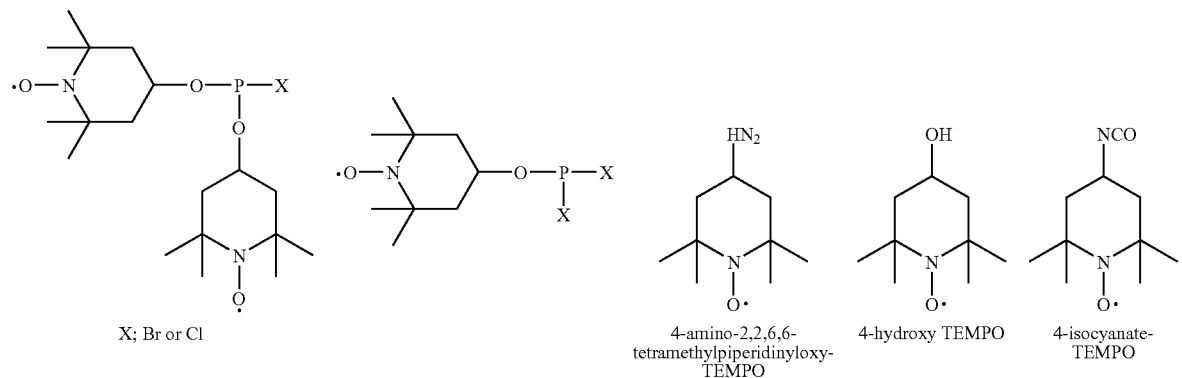
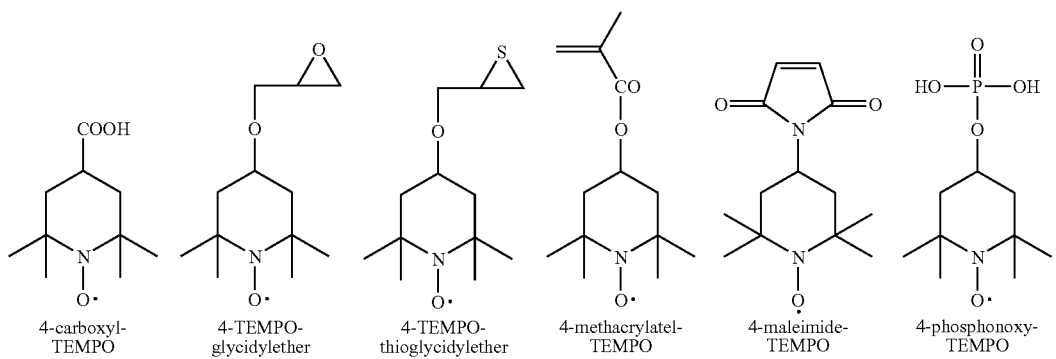
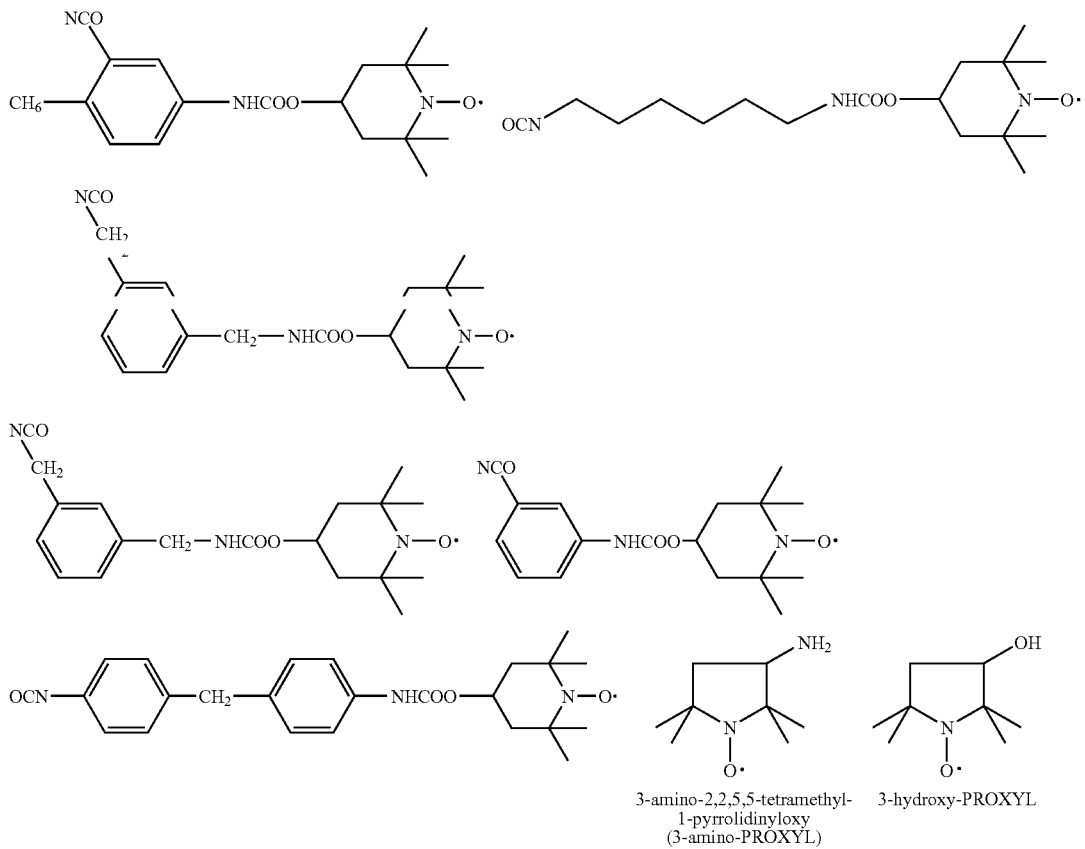

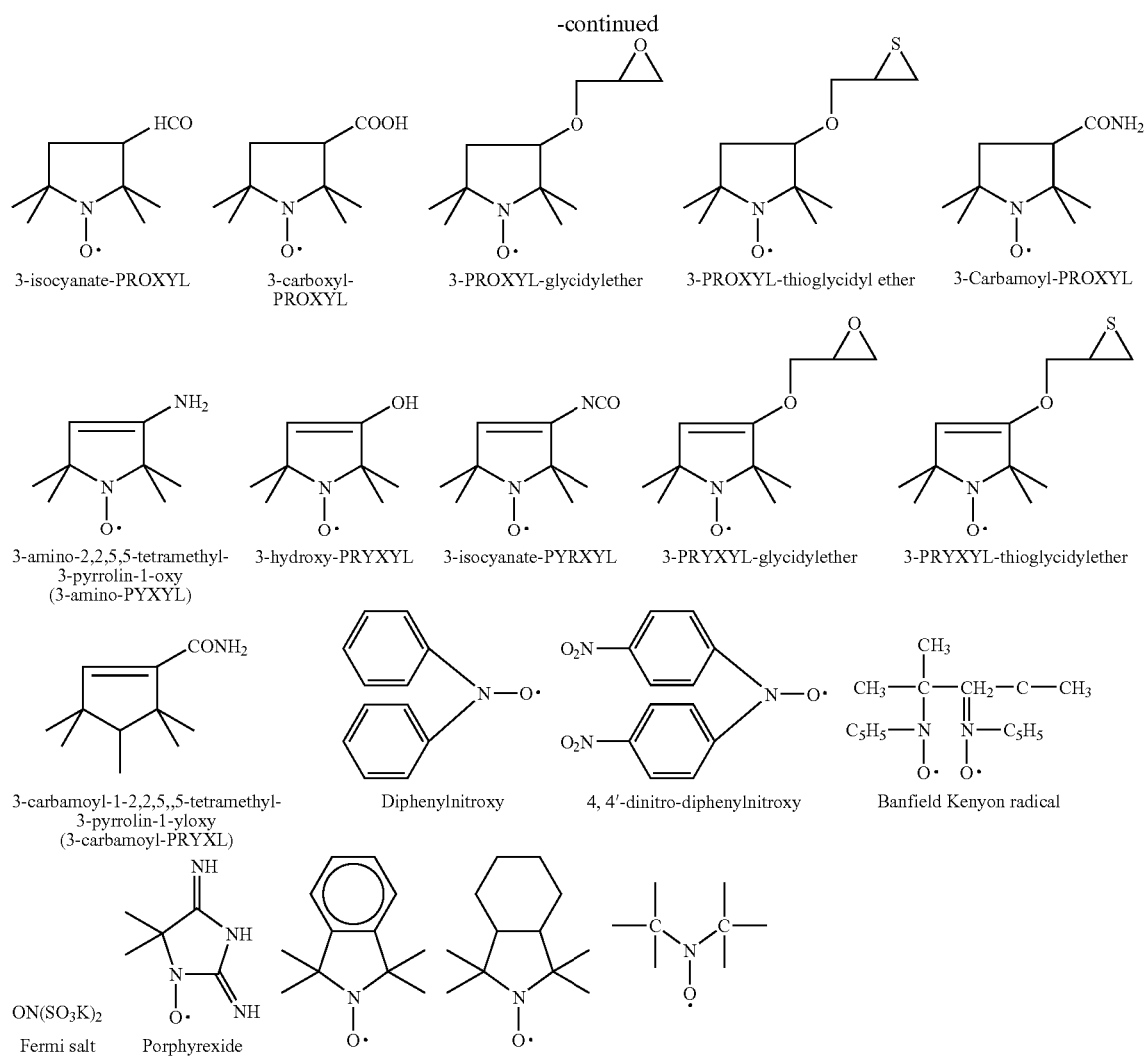

The amount of the compound (a) used in the present invention is not particularly limited, but is preferably 0.001 to 0.5 mole, more preferably 0.005 to 0.1 mole, based upon 100 g of the butyl rubber to be modified. If the amount is small, the modification amount of the butyl rubber is liable to become lower, but conversely if large, the subsequent cross-linking is liable to stop proceeding.

As the radical initiator (b) usable in the present invention, it is possible to use any radical initiator capable of introducing the compound (a) into a molecular chain of butyl rubber. Specifically, benzoylperoxide, t-butylperoxybenzoate, dicumylperoxide, t-butylcumylperoxide, di-t-butylperoxide, 2,5-dimethyl-2,5-di-t-butylperoxyhexane, 2,5-dimethyl-2,5-di-t-butylperoxy-3-hexine, 2,4-dichlorobenzoylperoxide, di-t-butylperoxy -di-isopropylbenzene, 1,1-bis(t-butylperoxy)-3,3,5-trimethyl-cyclohexane, n-butyl-4,4-bis(t-butylperoxy) valerate, 2,2-bis(t-butylperoxy)butane, diisobutylperoxide, cumylperoxyneodecanate, di-n-propylperoxydicarbonate, diisopropyl-peroxydicarbonate, di-sec-butylperoxydicarbonate, 1,1,3,3-tetramethylbutylperoxyneodecanate, di(4-t-butylcyclohexyl) peroxydicarbonate, 1-cyclohexyl-1-methylethylperoxyneodecanate, di(2-ethoxyethyl) peroxydicarbonate, di(2-othoxyhoxyl) peroxydicarbonate, t hexylperoxyneodecanate, dimethoxybutylperoxydicarbonate, t-butylperoxyneodecanate, t-hexylperoxypivalate, t-butylperoxypivalate, di(3,5,5-trimethylhexanoyl)peroxide, di-n-octanoylperoxide, dilauroylperoxide, distearoylperoxide, 1,1,3,3-tetramethylbutylperoxy-2-ethylhexanoate, disuccinic acid peroxide, 2,5-dimethyl -2,5-di(2-ethylhexanoylperoxy)hexane, t-hexylperoxy-2-ethylhexanoate, di(4-methylbenzoyl)peroxide, t-butylperoxy -2-ethylhexanoate, a mixture of di(3-methylbenzoyl) peroxide and benzoyl(3-methylbenzoyl) peroxideand dibenzoylperoxide, dibenzoylperoxide, t-butylperoxyisobutyrate, etc. may be illustrated. Further, as typical examples of initiators capable of decomposing at a low temperature due to the action of a redox catalyst, dibenzoyl peroxide, paramethane hydroperoxide, diisopropylbenzene hydroperoxide, 1,1,3,3-tetramethylbutyl hydroperoxide, cumen hydroperoxide, t-butyl hydroperoxide, etc. may be illustrated. By adding these initiators to the reaction system (or mixture system, catalyst system), it is possible to generate carbon radicals in the butyl rubber, a modified butyl rubber can be obtained by reacting the compound (a) having a stable free radical with the carbon radical.

The addition amount of the radical initiator (b) used in the present invention is not particularly limited, but is preferably 0.001 to 0.5 mole, more preferably 0.005 to 0.2 mole, based upon 100 g of butyl rubber to be modified. If the amount is too small, the amount of hydrogen atoms pulled out from the butyl rubber chain is liable to be decreased, while conversely if too large, the main chain of the butyl rubber is liable to be easily decomposed and the molecular weight is liable to be greatly decreased.

The bi- or more-functional radical polymerizable monomer (c) usable in the present invention is not particularly limited, but, for example, ethylenedi(meth)acrylate (here the expression "ethylene di(meth)acrylate" meaning both ethylene dimethacrylate and ethylene diacrylate, the same below), trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth) acrylate, tetramethylolmethane tetra(meth)acrylate, tris(2-hydroxyethyl)isocyanulate tri(meth)acrylate, ethoxylated trimethylolpropane tri(meth)acrylate, pentaerythritol tri (meth)acrylate, ethoxylated trimethylolpropane tri(meth) acrylate, propoxylated trimethylolpropane(meth)acrylate, propoxylated glyceryl(meth)acrylate, pentaerythritol tetra (meth)acrylate, ditrimethylolpropane tetra(meth)acrylate, dipentaerythritol penta(meth)acrylate, ethoxylated pentaerythritol tetra(meth)acrylate, polysiloxane di(meth)acrylate, various types of urethane(meth)acrylate, various types of metal(meth)acrylate, polypropyleneglycol di(meth)acrylate, N,N'-phenylene dimaleimide, bismaleimide diphenylmethane, N,N'-phenylene diacrylamide, divinylbenzene, triallyl isocyanulate, etc. may be mentioned. Among these, monomers including electron acceptor groups in the molecule (for example, carbonyl groups (ketones, aldehydes, esters, carboxylic acids, carboxylates, and amides), nitro group, cyano group, etc.) are preferable from the viewpoint of increasing the modification rate.

The amount of the bi- or more-functional radical polymerizable monomer (c) is not particularly limited, but is preferably 0.001 to 0.5 mole, more preferably 0.005 to 0.2 mole, based upon 100 g of the butyl rubber to be modified. If the amount is too small, the later cross-linking is liable not to proceed, while conversely if too large, the physical properties of the cross-linked product are liable to be deteriorated.

The bi- or more-functional radical polymerizable monomer (d) usable in the present invention is not particularly limited, but those which are the same as the above-mentioned radical polymerizable monomer (c) may be mentioned, but in the present invention, it is preferable to use a bi- or more-functional radical polymerizable monomer (d) which is different from the bi- or more-functional radical polymerizable monomer (c) to increase the mechanical strength of the later cross-linked product.

The amount of the bi- or more-functional radical polymerizable monomer (d) is not particularly limited, but is preferably 0.001 to 0.5 mole, more preferably 0.005 to 0.2 mole, based upon 100 g of the butyl rubber to be modified. If the amount is too small, the desired increase in the mechanical strength is liable not to be expressed, while conversely if too large, the physical properties of the cross-linked product are liable to be decreased.

In the present invention, the method for modifying the butyl rubber with the compound (a), the initiator (b) and the monomer (c) is not particularly limited, but, for example may be modified as follows. A mixture of a premixed butyl rubber, compound (a), initiator (b) in a nitrogen-substituted internal kneader is reacted at a temperature of 150 to 220° C. The temperature is then lowered once, then, after adding monomer (c), nitrogen substitution is performed again, and by kneading and reacting at a temperature of 120 to 220° C., the desired modified butyl rubber composition may be obtained. Further, the butyl rubber, compound (a), the initiator (b) and the monomer (c) are able to be simultaneously kneaded and reacted. According to the present invention, the monomer (d) is able to be kneaded and reacted. Note that, the reaction and the kneading are able to be performed, using a twin-screw extrusion type kneader, single-screw extrusion type kneader, roll, and the like.

To the modified butyl rubber composition of the present invention preferably, preferably 0.05 to 15 parts by weight, more preferably 0.1 to 10 parts by weight, 100 parts by weight of the rubber component including based upon the modified butyl rubber, a cross-linking agent (e.g., organic peroxides such as benzoyl peroxide, t-butyl peroxybenzoate, dicumyl peroxide, t-butyl cumyl peroxide, di-t-butyl peroxide, 2,5-dimethyl-2,5-di-t-butylperoxy hexane, 2,5-dimethyl-2,5-di-t-butylperoxy-3-hexane, 2,4-dichloro-benzoyl peroxide, di t butylperoxy di-isopropylbenzene, 1,1-bis(t-butyl peroxy)-3, 3,5-trimethyl cyclohexane, n-butyl-4,4-bis(t-butyl peroxy) valerate, 2,2-bis(t-butyl peroxy)butane and azo-based radical initiators such as azodicarbonamide, azobisisobutyronitrile, 2,2'-azobis-(2-amidinopropane)dihydrochloride, dimethyl 2,2'-azobis(isobutyrate), azobiscyanovaleric acid, 1,1'-azobis-(2,4-dimethylvaleronitrile), azobismethylbutyronitrile, 2,2'-azobis-(4-methoxy-2,4-dimethylvaleronitrile), or the like).

The rubber composition according to the present invention may contain, in addition to the above components, a reinforcing agent (filler) such as carbon black, silica, a vulcanization or cross-linking agent, vulcanization or cross-linking accelerator, various types of oils, antioxidant, plasticizer, and other various types of additives generally added for tire and other rubber composition use. These additives may be compounded by a general method to obtain a composition used for vulcanization or cross-linking. The amounts of these additives may be made the conventional general amounts unless the object of the present invention is not adversely affected.

EXAMPLES

Examples will now be used to further explain the present invention, but the scope of the present invention is by no means these Examples.

Starting Materials Used

IIR: Butyl rubber (BUTYL 301 made by Lanxness)

1,3-bis-(t-butylperoxyisobutyl)benzene: (Parkadox 14-G made by Kayaku Akzo Corporation)

OH-TEMPO: 4-hydroxy-2,2,6,6-tetramethyl piperidinyl-1-oxyl (LA7RD made by Asahi Denka)

Ditrimethylolpropane tetraacrylate: (SR-355 made by Sartomer)

Dipentaerythritol hexacrylate: (A-DPH made by Shin-Nakamura Chemical)

Preparation Example 1 of Modified IIR Composition (IIR-GTS)

IIR 350.0 g, 1,3-bis-(t-butylperoxyisopropyl)benzene 24.2 g and OH-TEMPO 32.2 g were charged into an internal Banbury mixer set to a temperature at 60° C. and mixed for 10 minutes. The resultant mixture was kneaded in an internal Banbury mixer set to a temperature at 100° C., while substituting nitrogen for 5 minutes. While kneading, the temperature was raised to 165° C. and the kneading continued for 20 minutes. A part of the resultant polymer was dissolved in toluene, then the polymer was isolated and purified by a reprecipitation operation. By using the purified product and analyzing the same by 1H-NMR, the introduction of a TEMPO site was confirmed. The introduction rate was 0.360 mol %. The reaction system was returned once to 150° C., then dimethylolpropane tetraacrylate (SR-355) 44.9 g was added and the resultant mixture was kneaded, while substituting nitrogen for 5 minutes. While kneading, the temperature was raised to 185° C., then the resultant mixture was kneaded for 15 minutes. A part of the resultant polymer was dissolved in toluene, then the polymer was isolated and purified by a reprecipitation operation. The purified product was used for IR analysis and 1H-NMR analysis. Near at 1720 cm$^{-1}$, carbonyl derived absorption of ester was observed. From the 1H-NMR, a DTMP derived signal was observed near 6.39, 6.10, 5.96, 4.12 and 3.30 ppm. It was confirmed that SR-355 was introduced by a structure leaving three olefins. The introduction rate was 0.190 mol %.

Preparation Example 2 of Modified IIR Composition (IIR-CTH)

IIR 350.0 g, 1,3-bis-(t-butylperoxyisopropyl)benzene 24.2 g, and OH-TEMPO 32.2 g were charged into an internal Banbury mixer set to a temperature at 60° C. and mixed for 10 minutes. The resultant mixture was kneaded in an internal Banbury mixer set to a temperature at 100° C., while substituting nitrogen for 5 minutes. While kneading, the temperature was raised to 165° C. and the kneading continued for 20 minutes. A part of the resultant polymer was dissolved in toluene, then the polymer was isolated and purified by a reprecipitation operation. By using the purified product and analyzing the same by 1H-NMR, the introduction of a TEMPO site was confirmed. The rate of introduction was 0.360 mol %. The reaction system was returned once to 150° C., then dipentaerithritol hexaacrylate (A-DPH) 18.0 g was added and the resultant mixture kneaded, while substituting nitrogen for 5 minutes. While kneading, the temperature was raised to 185° C., then the resultant mixture was kneaded for 15 minutes. A part of the resultant polymer was dissolved in toluene, then the polymer was isolated and purified by a reprecipitation operation. The purified product was used for IR analysis and 1H-NMR analysis. Near 1720 cm$^{1}$, carbonyl derived absorption of ester was observed. From the 1H-NMR, an A-DPH derived signal was observed near 6.40, 6.09, 5.82, 4.11, and 3.32 ppm. It was confirmed that A-DPH was introduced by a structure leaving five olefins. The introduction rate was 0.0564 mol %.

Examples 1 to 4, Reference Examples 1 to 2, and Comparative Examples 1 to 3

Preparation of Sample
In each formulation (parts by weight) shown in Table I, the ingredients other than the vulcanization accelerator and sulfur were kneaded in a 150 cc kneader for 6 minutes. The vulcanization accelerator and sulfur were added and the mixture further kneaded by an open roll to obtain a rubber composition.

The resultant rubber composition was press vulcanized in a 15×15×0.2 cm mold at 180° C. for 20 minutes to form a vulcanized rubber sheet, which was determined for the physical properties of the vulcanized rubber by the following test methods. The results are shown in Table I.

Test Methods for Evaluation of Rubber Physical Properties
State of cross-linked rubber sheet: Judged visually. 50% modulus (MPa): Test piece of No. 3 dumbbell was punched from a sheet and was measured for 0% modulus according to JIS K6251.
Strength at break (MPa): Test piece of No. 3 dumbbell was punched from a sheet and was measured for strength at break according to JIS K6251.
Compression set (%): Based on JIS K 6251, a sample with a predefined shape was prepared under the same forming conditions as the D hardness measurement sample and was determined for compression set after 72 hours at 105° C. and 25% compression.

TABLE I

|  | Comp. Ex. 1 | Comp. Ex. 2 | Comp. Ex. 3 | Ref. Ex. 1 | Ref. Ex. 2 | Ex. 1 | Ex. 2 | Ex. 3 | Ex. 4 |
|---|---|---|---|---|---|---|---|---|---|
| Reg-IIR[1] | 100 | 100 | 100 | — | — | — | — | — | — |
| IIR-GTS[2] | — | — | — | 100 | 100 | 100 | 100 | 100 | — |
| IIR-GTH[2] | — | — | — | — | — | — | — | — | 100 |
| Talc[3] | 100 | 100 | 100 | 100 | 100 | 100 | 100 | 100 | 100 |
| Carbon black[4] | 50 | 50 | 50 | 50 | 50 | 50 | 50 | 50 | 50 |
| Stearic acid[5] | 1 | 1 | 1 | 1 | 1 | 1 | 1 | 1 | 1 |
| Zinc white[6] | 5 | 5 | 5 | 5 | 5 | 5 | 5 | 5 | 5 |
| DCP[7] | 2 | 2 | 8 | 2.3 | 2.3 | 3.5 | 3.5 | 3.5 | 3.5 |
| TMPT[8] | — | 12 | — | — | — | — | — | — | — |
| SR-355[9] | — | — | — | — | 6.4 | — | — | — | — |
| A-TMPT[10] | — | — | — | — | — | 3.5 | — | — | 7.0 |
| A-DPH[11] | — | — | — | — | — | — | 1.7 | — | — |
| TAcrylC[12] | — | — | 12.0 | — | — | — | — | 3.0 | — |
| State of cross-linked rubber sheet | Sheet not formable | Sheet not formable | Sheet not formable | Sheet not formable | Sheet not formable | Sheet not formable | Sheet not formable | Sheet not formable | Sheet not formable |
| 50% modulus (MPa) | — | — | — | 2.6 | 3.0 | 3.6 | 3.2 | 3.6 | 3.2 |
| Strength at break (MPa) | — | — | — | 3.9 | 3.8 | 4.5 | 4.2 | 4.6 | 4.0 |
| Compression set (%) | — | — | — | 36 | 54 | 32 | 31 | 26 | 31 |

Notes of Table I
[1])Butyl rubber: BUTYL 301 made by Lanxness
[2])Synthesized by Preparation Examples 1 and 2
[3])Talc F: made by Nippon Talc
[4])Asahi #50: made by Asahi Carbon
[5])Beads Stearic Acid YR: made by NOF Corporation
[6])Zinc White Type 3: made by Seido Chemical Industrial
[7])Dicumyl peroxide: made by NOF Corporation, Percumyl D-40
[8])Trimethylolpropane trimethacrylate: made by Shin-Nakamura Chemical
[9])Ditrimethylolpropane triacrylate: made by Sartomer
[10])Trimethylolpropane triacrylate: made by Shin-Nakamura Chemical
[11])Dipentaerythritol hexacrylate: made by Shin-Nakamura Chemical
[12])Tris(2-acryloxyethyl) isocyanulate: made by Shin-Nakamura Chemical According to the present invention, by compounding, to a peroxide cross-linkable modified butyl rubber, obtained by grafting, to a butyl rubber, a compound having a nitroxide-free radical in the molecule thereof and further reacting the same with a polyfunctional acrylate, a polyfunctional acrylate different from the acrylate used during modification, the mechanical strength of the cross-linked product can be increased, and therefore, the present invention is useful for tire tubes, auto parts, curing bags, medicine bottle caps, hoses, cables, electrical components, sealants for electrical components, etc. superior in the heat resistance and low pressure compression set.

The invention claimed is:

1. A modified butyl rubber composition comprising a butyl rubber modified by mixing, under heating, with (a) a compound having a nitroxide free-radical in the molecule thereof, which is stable at an ordinary temperature even in the presence of oxygen, (b) a radical initiator and (c) a bi- or more-functional radical polymerizable monomer, whereby the compound (a) is grafted to the butyl rubber and the bi- or more functional monomer (c) is further reacted thereto and further compounded with (d) a bi- or more-functional radical polymerizable monomer, which is different from the component (c), whereby mechanical strength after cross-linking is increased.

2. A modified butyl rubber composition as claimed in claim 1, wherein the component (a) and the component (b) are first added to the butyl rubber and mixed together, under heating, then the component (c) is further mixed under heating.

3. A modified butyl rubber composition as claimed in claim 1, wherein the bi- or more-functional radical polymerizable monomer (c) has an electron acceptor group.

4. A modified butyl rubber composition as claimed in claim 1, further comprising a cross-linking agent.

5. A modified butyl rubber composition as claimed in claim 1, comprising 0.05 to 15 parts by weight of a cross-linking agent based upon 100 parts by weight of the rubber component.

6. A modified butyl rubber composition as claimed in claim 1, comprising 5 to 300 parts by weight of a reinforcing filler, based upon 100 parts by weight of the rubber component.

* * * * *